United States Patent [19]
Tasker et al.

[11] Patent Number: 5,881,136
[45] Date of Patent: Mar. 9, 1999

[54] FAX OVERFLOW SYSTEM

[75] Inventors: Michael Tasker, Pleasonton; Yigal Brandman, Palo Alto; Frank C. H. Lin, Saratoga; Shahryar Soroosh, Saratoga; Jason Subramaniam, Fremont, all of Calif.

[73] Assignee: Octel Communication Corporation, Milpitas, Calif.

[21] Appl. No.: 886,710

[22] Filed: Jul. 1, 1997

Related U.S. Application Data

[63] Continuation of Ser. No. 634,517, Apr. 18, 1996, abandoned, which is a continuation of Ser. No. 118,884, Sep. 10, 1993, abandoned.

[51] Int. Cl.⁶ ................................................. H04M 11/00
[52] U.S. Cl. .................. 379/100.09; 358/407; 358/404; 379/88.13
[58] Field of Search ...................... 379/100.08, 100.09, 379/100.06, 100.12, 100.15, 100.16, 89, 88, 88.13; 358/402, 403, 440, 407, 444

[56] References Cited

U.S. PATENT DOCUMENTS

| | | | |
|---|---|---|---|
| 4,837,798 | 6/1989 | Cohen et al. | 379/88 |
| 4,922,348 | 5/1990 | Grillon et al. | 358/407 |
| 4,922,486 | 5/1990 | Lidinsky et al. | 370/60 |
| 4,994,926 | 2/1991 | Gordon et al. | 358/407 |
| 5,008,926 | 4/1991 | Mishdi | 379/89 |
| 5,068,888 | 11/1991 | Scherk et al. | 379/100 |
| 5,204,858 | 4/1993 | Kinashi et al. | 370/61 |
| 5,282,238 | 1/1994 | Berland | 379/100 |
| 5,291,302 | 3/1994 | Gordon et al. | 379/100 |
| 5,307,178 | 4/1994 | Yoneda | 358/440 |
| 5,367,564 | 11/1994 | Sutoh et al. | 379/100.09 |
| 5,410,591 | 4/1995 | Takahashi | 379/201 |
| 5,530,740 | 6/1996 | Irribarren et al. | 379/100.08 |

*Primary Examiner*—Stella Woo
*Attorney, Agent, or Firm*—Haverstock & Owens LLP

[57] ABSTRACT

In a system where fax messages are directed to a store and forward system when a fax machine is busy: When fax messages are stored and an attempt is made to re-deliver the message, an ID related to the serial number of the storage system is placed in the fax header. When a message is received by the store and forward system, the header is interrogated and if an ID related to the serial number of the receiving machine is detected, the fax is not again stored and the system notes that the transmission to the fax machine was not successful.

23 Claims, 4 Drawing Sheets

FAX OVERFLOW SYSTEM

This is a Continuation of application Ser. No. 08/634,517 filed on Apr. 18, 1996, now abandoned, which is Continuation of application Ser. No. 08/118,884, filed on Sep. 10, 1993, abandoned.

FIELD OF THE INVENTION

The present invention relates to telephone and facsimile systems, and more particularly to a technique and apparatus for handling a call when the called machine is busy.

BACKGROUND OF THE INVENTION

Electronic facsimile machines, often called fax machines, are in widespread use. Such machines transfer images from one location to another location electronically over a normal telephone line. Likewise voice mail systems are in widespread use. Such systems answer telephones and store messages for later retrieval.

Recently systems have become available which merge voice mail technology and facsimile technology. Such systems provide what is termed "fax store and forward" services. For example see U.S. Pat. No. 5,008,926 issued Apr. 16, 1991 and U.S. Pat. No. 4,837,798.

The present invention solves a particular problem which arises when a "fax store and forward" system is connected to a PBX system. In such systems, if a fax machine is busy when the machine is called, the call is re-directed to the fax store and forward system. Later the store and forward system utilizes one of its ports to call the fax machine to deliver the fax. If the fax machine is still busy, the call will be redirected back to a different port of the store and forward system and without the special precautions, the fax would be stored a second time. The present invention is directed to eliminating the problems which arise when the same fax message is re-directed to a fax store and forward system, multiple times.

SUMMARY OF THE PRESENT INVENTION

In a system where fax messages are directed to a store and forward system when a fax machine is busy: When fax messages are stored and an attempt is made to re-deliver the message, an ID related to the serial number of the storage system is placed in the fax header. When a message is received by the store and forward system, the header is interrogated and if an ID related to the serial number of the receiving machine is detected, the fax is not again stored and the system notes that the transmission to the fax machine was not successful.

DETAILED DESCRIPTION OF A PREFERRED EMBODIMENT

Figure 1:
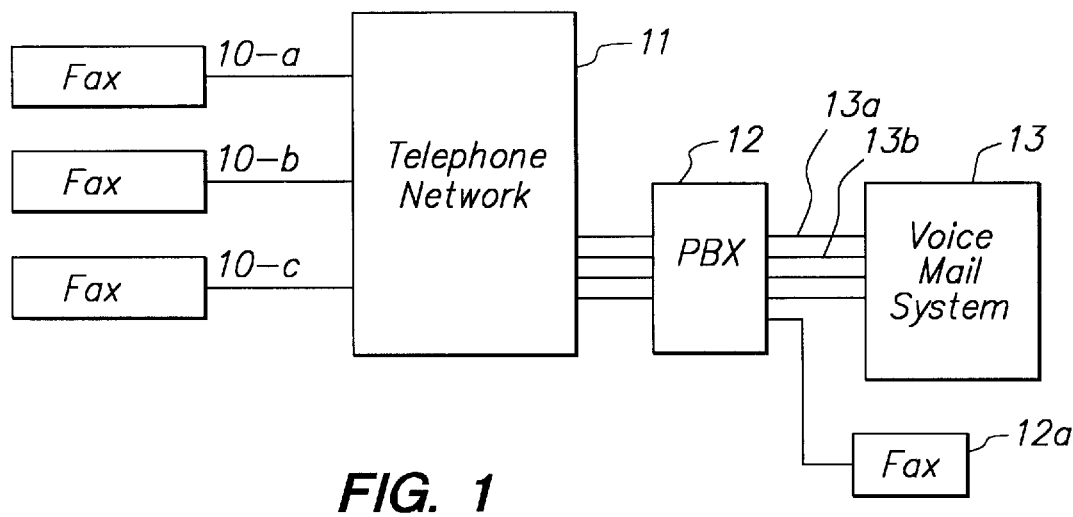
FIG. 1 is a block diagram of an embodiment of the invention.

An overall block diagram of a system which embodies the present invention is shown in FIG. 1. The system includes a number of fax machines 10-a to 10-c connected to a telephone network 11. While only three machines are shown, such a system can include a large number of fax machines similarly connected. The telephone network 11 can be the normal public telephone network.

The system also includes a PBX 12, a fax machine 12a and a voice mail system 13. The PBX 12 is a conventional PBX and fax machine 12a is connected to one of the normal extension lines from PBX 12. Voice mail system 12 is connected to PXB 12 in a normal manner and if a call is directed to fax 12a when the fax 12a is already busy, the call is re-directed by PBX 12 to voice mail system 13. This is the conventional manner that a PBX and a voice mail system are integrated.

Figure 2:
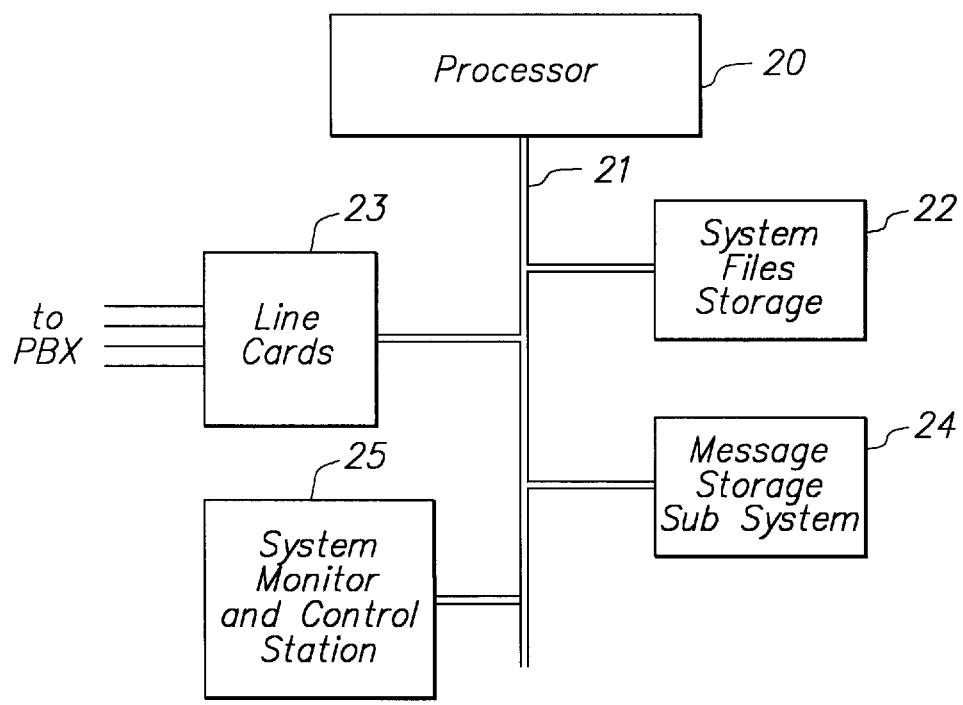
FIG. 2 is a more detailed block diagram of the voice mail system shown in FIG. 1.

FIG. 2 is a block diagram of voice mail system 13. The system includes a processor 20 which could for example be an Intel 386 or 486 processor. The processor 20 is connected by serial bus 21 to a number of units including a disk drive 22 which stores system files, a disk drive 24 which stores voice messages, a system monitor and control 25 which provides commands and control for the system, and line cards 23 which connect to the telephone extension lines which originate at PBX 12. The components shown in FIG. 2 are conventional.

Figure 2A:
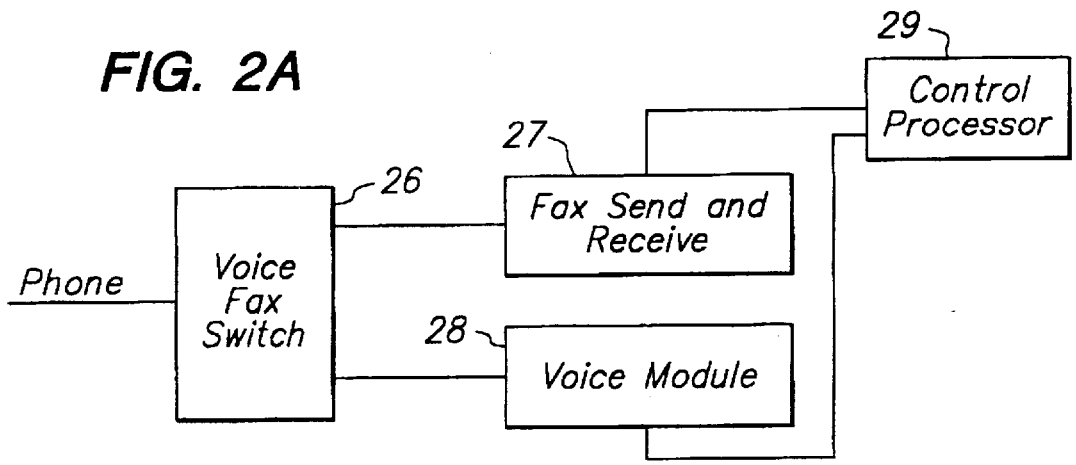
FIG. 2A is a block diagram of the line cards shown in FIG. 2.

A block diagram of one of the line cards 23 is shown in FIG. 2A. Each line card combines on one line card two capabilities that are widely available, namely, voice line cards that have been available for many years in voice mail systems and fax capabilities that are widely available as fax cards for personal computers. The main components of the line card shown in FIG. 2A are the voice fax-switch 26 which directs a call to either a voice portion 28 of the card or to a fax portion 27 of the card. The operation of the card is controlled by control logic 29 which may be a programmed microprocessor.

Figure 2B:
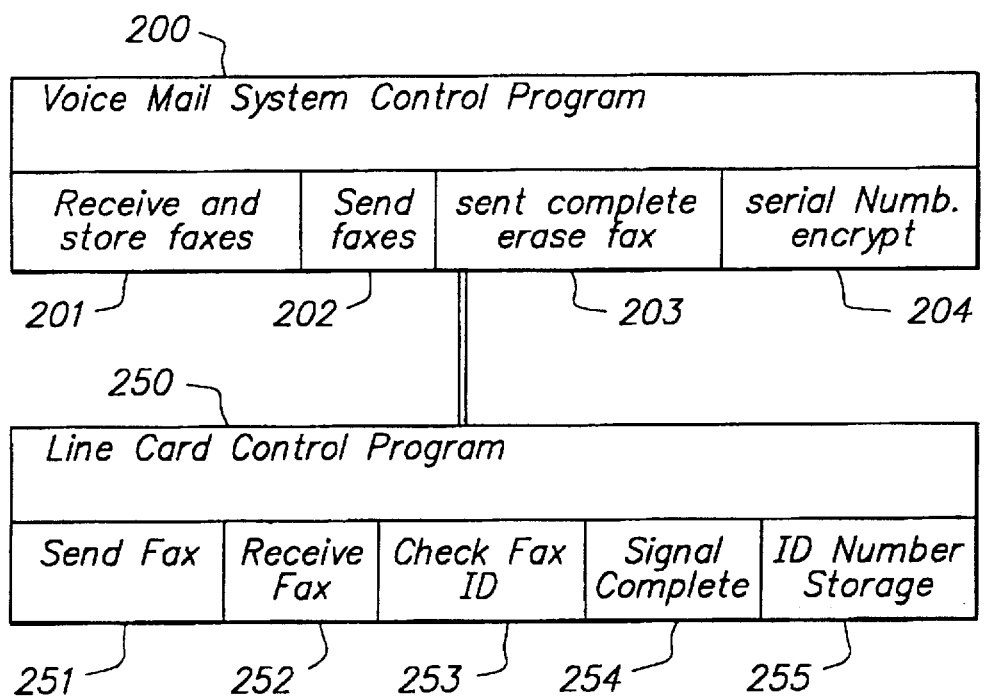
FIG. 2B is a block diagram showing the modules in the control programs.

As is conventional the voice mail system 13 operates in response to a main control program 200. Likewise the control circuit 29 shown in FIG. 2A is a programmed microprocessor which operates in response to a program 250. These processors and their programs are conventional. The main modules in the programs that are relevant to the present invention are shown in FIG. 2B. The program 200 has a module 201 which receives fax data from the line cards and which stores fax data in mailboxes in a manner similar to the way voice messages are stored. Both the fax data and the identification number of the extension to which the fax was directed are stored. Module 202 in program 200 outdials and delivers each stored fax to the extension to which the fax was originally directed or to another designated number. The outdialing occurs at a fixed time after a fax is received and repeatedly thereafter until the transmission is successful or until a maximum number of tries is reached. Finally program 200 has a module 203 which receives from the line card an indication if the transmission of a fax was successful. If the transmission was successful the fax is erased from the system or stored for archival purposes. If the transmission was not successful, the fax is rescheduled for delivery at a later time.

The modules in the program 250 which controls the line card shown in FIG. 2 are a module 251 which sends faxes, a module 252 which receives faxes, a module 253 which checks the ID of a received fax and a module 254 which signals processor 29 that the delivery of a fax has been performed successfully. These modules are conventional with the exception of the ID checking module 253. This module is a program checks a number in the Subscriber Identification Frame of the fax and under certain conditions explained late, instructs the line card to terminate the reception (i.e. to stop the operation) before the reception arrives at a point where a message completion signal MCF is sent.

Figure 3:
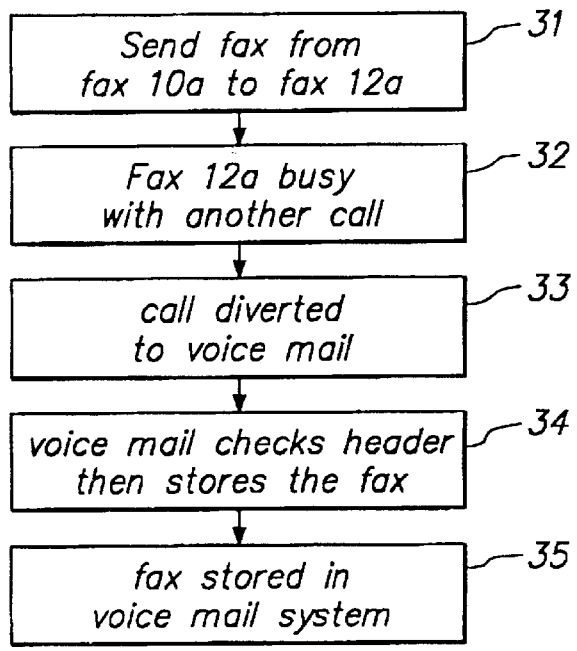
FIG. 3 is a flow diagram of the operations that take place when messages are stored.

The operations which occur when fax machine 10a tries to send a fax to fax machine 12a, at a time when fax machine 12a is busy are shown in FIG. 3. As is conventional when an extension connected to a PBX is busy (block 32), the call is directed to voice mail system 13 (block 33). The voice mail system 13 checks the header of the fax and determines that the fax header does not contain the serial number of voice mail system 13 (block 34). The fax is therefore stored in the voice mail system 13 (block 35).

Figure 4:
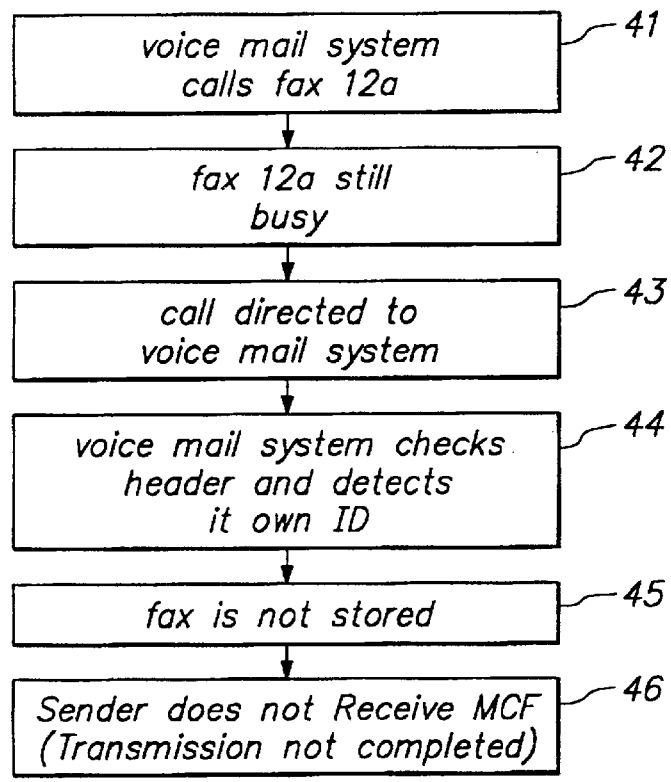
FIG. 4 is a flow diagram of the operations that take place when the fax store and forward system tries to re-deliver a stored messages and the fax machine is still busy.

The operations which occur at a later time when voice mail system 13 tries to deliver the fax to fax machine 12a and fax machine 12a is still busy is shown in FIG. 4. As shown by block 41, the operations start when the voice mail system 13 tries to call fax 12a (block 41). The call may for example go out of the voice mail system on line 13a. The PBX 12 determines that the fax is still busy (block 42), and the call is re-directed to the voice mail system 13 (block 43). The call may for example come into voice mail system 13 on line 13b. As shown by block 44, the voice mail system 13 will check the header of the message and determine that it contains the serial number of voice mail system 13. The system will therefore know that the call originated with voice mail system 13 and the fax will not be stored and no "transmission compete" signal will be sent to the sending line card. Thus, the sending line card will know that the transmission was not successful and it will inform the system 13 that another attempt to re-deliver the fax is required.

Figure 5:
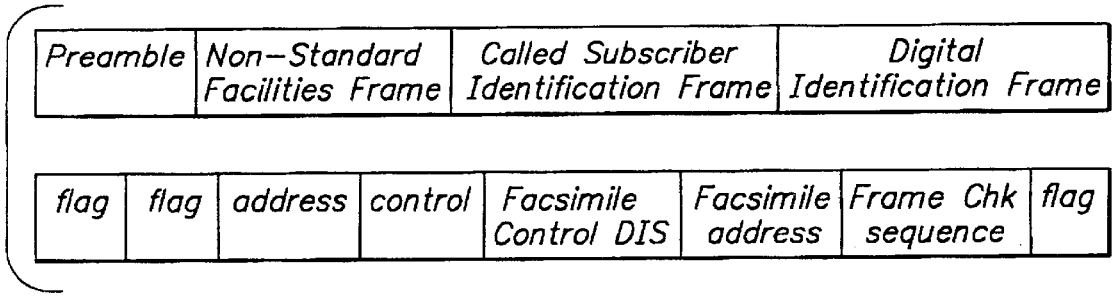
FIG. 5 is a diagram of the header in a fax message.

FIG. 5 is a diagram showing the fields in the header of a normal fax message as defined by the "Blue Book" Volume VII, Recommendations T.0–T.63, published in November 1988 by The International Telegraph and Telephone Consultative Committee (CCITT) of the International Telecommunications Union.

The field of particular relevance to the present invention is the "Called Subscriber Identification Frame" (i.e. the CCI). Normally the telephone number of the called fax machine is placed in this field. However, with the present invention, the system ID (or a number related to the system ID) is placed in this field. The system ID is the serial number of the sending voice mail system.

It is noted that the called subscriber identification appears printed on the header of a fax when a fax is received. It would be undesirable to have a voice mail systems serial number become widely know. The reason is that this number would be of use to "hackers". For this reason that an encryption algorithm 204 is provided in the control program of the voice mail system 13. The identification number transmitted to the ID number storage on each line card on the system is an encrypted version of the system ID. Since each line card in a system receives the same sequence of numbers, the line cards can tell if a fax is being received from another line card on the same system. However, since the number is an encrypted version of the system serial number, a hacker who sees the number on the header of a fax will not find the number to be of any use.

In an alternative embodiment of the invention the system serial number in encrypted or open form could be put in the "Non-standard Facilities Frame" frame of the header. In this way the number would not be printed on the top of a fax. However, even if the ID information is placed in the Non-Standard Facilities Frame, it would be desirable to encrypt the serial number in even this situation in order to prevent someone who intercepts the fax with more sophisticated equipment than a normal fax machine from being able to extract the sending systems serial number.

It is noted that the serial number encryption algorithm only operates when a system is first initialized. At this time the appropriate encrypted ID is sent to the ID serial number storage 255 on each line card. This does not have to be done again until the system is powered down for some reason.

Figure 6:
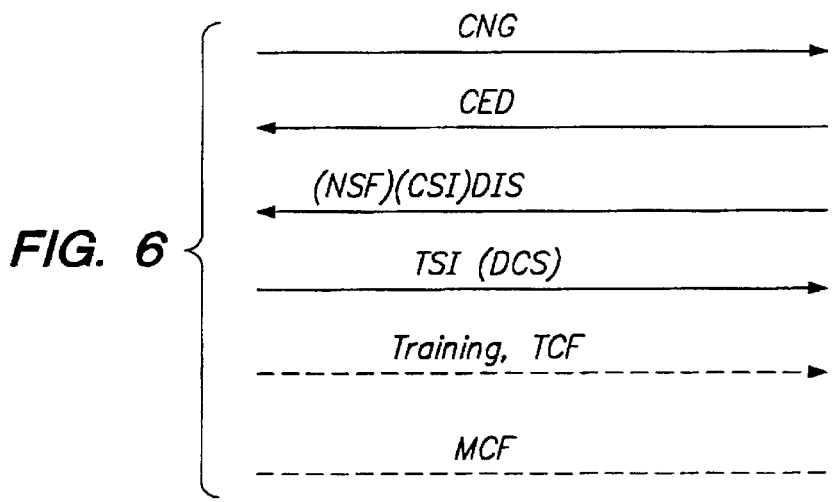
FIG. 6 is a diagram of the hand-shake protocol which occurs when a fax machine sends a message.

FIG. 6 shows the "handshaking" that takes place when a line card attempts to deliver a fax. The sending line card first sends a "Calling Tone" CNG. This is the tone one hears if one inadvertently picks up a telephone which is being called by a fax machine. The called line card (or the called fax machine) responds with a "Called Station Identification" tone CED. Next the called station sends the calling station a "Digital Identification Signal" DIS, a "Called Subscriber Identification" CSI, and a "Non Standard Facilities Frame" NSF. The calling station then sends "Transmitting Subscriber Identification" TSI signal and a "Digital Command" signal DCS. At this point in the process, the sending and the receiving machine or line cards have each other's identification. If the receiver is the called fax machine, the process continues and the fax message is transmitted. When the transmission is complete a "Message Confirmation" MCF signal is sent and the sending line card informs the control program 200 that the process has been successfully completed and the fax in storage can be erased.

If a call from a line card is diverted to another line card by the PBX 12 because the called extension is busy, the receiving line card would determine that the "Called Subscriber Identification" is identical to the number in the called line cards ID number storage 255. The called line card would terminate the receipt at this point and it would never send a MCF signal. The calling line card would therefore never inform the program 200 that the operation was successful and the system would try to re-send the fax at a later time.

The invention has been shown and described with respect to preferred embodiments thereof. It will be recognized by those skilled in the art that various changes inform and detail may be made without departing from the spirit and scope to the invention For example, the PBX shown herein could be a CO/Centrix or other system that diverts calls to a voice mail system when an extension is busy. The scope of applicant's invention is limited solely by the appended claims.

I claim:

1. A fax store and forward system comprising:
   means for receiving and storing fax messages,
   means for periodically outdialing to deliver said fax messages stored in said system,
   means for inserting a same identifier indicating said fax messages are originated with said fax store and forward system in each of said fax messages outdialed from said fax store and forward system,
   means for determining if a received fax message includes the identifier, wherein the received fax message is not stored by the means for receiving and storing if the received fax message includes the identifier.

2. The fax store and forward system as claimed in claim 1 wherein the identifier represents a serial number of the fax store and forward system.

3. The fax store and forward system as claimed in claim 2 wherein the identifier includes an encrypted version of the serial number.

4. The fax store and forward system as claimed in claim 1 further comprising a plurality of voice mailboxes for storing voice messages.

5. The fax store and forward system as claimed in claim 1 further comprising means for sending a message confirmation signal once a fax message without an identifier has been received and stored.

6. A fax store and forward system which answers calls and stores fax messages, having a plurality of input lines, and a serial number, wherein the fax store and forward system is configured for coupling to a PBX system having a plurality of extensions and including means for re-directing a call to an appropriate one of said input lines when an extension to which said call is directed is busy, and further wherein one of the extensions of the PBX system is coupled to a fax machine, the fax store and forward system comprising:

means for storing a fax message directed to the fax machine when the fax machine is unavailable to receive the fax message;

means for periodically sending the fax message to the fax machine until a signal is received that the fax machine successfully received the fax message, wherein the means for periodically sending inserts a representation of the serial number into the fax message when the fax message is sent; and means for determining whether an incoming fax message directed to the fax machine includes the representation of the serial number, wherein the means for determining terminates reception of the incoming fax message if the incoming fax message does include the representation of the serial number.

7. The fax store and forward system as claimed in claim 6 wherein the representation of the serial number is an encrypted version of the serial number.

8. The fax store and forward system as claimed in claim 6 wherein the representation of the serial number is inserted into a header of the fax message.

9. The fax store and forward system as claimed in claim 6 further comprising a plurality of voice mailboxes for storing voice messages.

10. The fax store and forward system as claimed in claim 6 further comprising means for sending a message confirmation signal once a fax message without an identifier has been received and stored.

11. A method of storing and subsequently transmitting a fax message directed to a fax machine which is unavailable to receive the fax message, comprising the steps of:

a. storing a fax message directed to a fax machine which is unavailable to receive the fax message, if the fax message does not include an identifier indicating the fax message is originated with a fax store and forward system;

b. periodically sending the fax message including the identifier to the fax machine; and c. disabling the step of periodically sending when the fax machine has successfully received the fax message.

12. The method as claimed in claim 11 further comprising the step of storing the identifier in a header of the fax message before the step of periodically sending.

13. The method as claimed in claim 12 further comprising the step of receiving a message confirmation signal from the fax machine when the fax machine has successfully received the fax message.

14. The method as claimed in claim 11 further comprising the step of sending a message confirmation signal after a fax message without an identifier, has been received and stored.

15. An apparatus for receiving fax messages comprising:

a. a telephone routing system including a plurality of extensions;

b. a fax receiving device coupled to one of the plurality of extensions for receiving fax messages directed to the fax receiving device through the telephone routing system; and c. a fax store and forward system coupled to at least one of the plurality of extensions for receiving and sending fax messages through the telephone routing system, the system including:

i. a storage device for storing a fax message directed to the fax receiving device when the fax receiving device is unavailable to receive the fax message, only if the fax message does not include an identifier indicating the fax message is originated with the fax store and forward system; and ii. a transmission device for periodically sending a stored fax message including the identifier to the fax receiving device through the telephone routing system until the stored fax message is received.

16. The apparatus as claimed in claim 15 wherein the identifier is included within a header of the stored fax message.

17. The apparatus as claimed in claim 15 wherein the telephone routing system is a PBX system.

18. The apparatus as claimed in claim 15 further comprising a plurality of voice mailboxes, each coupled to one of the extensions, for storing voice messages.

19. The apparatus as claimed in claim 15 wherein the fax store and forward system further comprises a confirmation device for sending a message confirmation signal once a fax message without an identifier has been received and stored.

20. A fax delivery system for delivering fax messages to a fax machine, comprising:

a. a telephone routing system having a plurality of extensions for routing the fax messages originally directed to the fax machine to a first one of the extensions when the fax machine is unavailable, wherein a second one of the extensions is coupled to the fax machine; and b. a voice message system coupled to at least one extension including the first for receiving the fax messages, wherein the fax messages are stored in conjunction with an extension number of the second extension if the fax messages are originated outside the voice message system such that the fax messages are not duplicatively stored in the voice message system and thereby forming stored fax messages, further wherein the voice message system periodically outdials to the second extension to deliver the stored fax messages.

21. The fax delivery system according to claim 20 wherein the voice message system comprises:

a. a plurality of line cards each coupled to one of the extension lines of the telephone routing system for receiving the fax messages and for inserting an identifier to the stored fax messages, wherein a call from a first line card to the fax machine is diverted to a second line card by the telephone routing system when the fax machine is unavailable, further wherein the identifier indicates the fax messages are originated with the fax delivery system;

b. a control program for determining whether the fax messages include the identifier and for terminating receipt of the fax messages if the fax message includes the identifier; and c. a storage unit for storing the fax messages if the fax messages do not include the identifier.

22. The fax delivery system as claimed in claim 21 wherein the identifier represents a serial number of the voice message system.

23. The fax delivery system as claimed in claim 21 wherein the voice message system sends a message confirmation signal once a fax message without the identifier is received and stored.

* * * * *

UNITED STATES PATENT AND TRADEMARK OFFICE
CERTIFICATE OF CORRECTION

PATENT NO. : 5,881,136

DATED : March 9, 1999

INVENTOR(S) : Michael Tasker *et al.*

It is certified that error appears in the above-identified patent and that said Letters Patent is hereby correct as shown below:

On the Title Page:
Item [75] Inventors:
Delete "Pleasonton" and insert --Pleasanton--.

Item [56] References Cited - U.S. PATENT DOCUMENTS:
Regarding U.S. Patent No. 4,922,348, delete "Grillon et al." and insert --Gillon et al.--.
Regarding U.S. Patent No. 5,008,926, delete "Mishdi" and insert --Misholi--.

In column 2, on line 18, delete "12" and insert --13-- between "Voice mail system" and "is"; and on line 19, delete "PXB" and insert --PBX-- between "to" and "12".
In column 4, on line 48, delete "inform" and insert --in form-- between "changes" and "and details"; and on line 50, insert a period, --.--, between "invention" and "For".

Signed and Sealed this

Fifth Day of October, 1999

*Attest:*

Q. TODD DICKINSON

*Attesting Officer*   Acting Commissioner of Patents and Trademarks